United States Patent [19]

Finnegan

[11] 4,325,153
[45] Apr. 20, 1982

[54] COMBINED SCREWDRIVER AND BORING APPARATUS

[76] Inventor: Charles Finnegan, 9582 Fairview Dr., Orangevale, Calif. 95662

[21] Appl. No.: 86,939

[22] Filed: Oct. 22, 1979

[51] Int. Cl.³ .......................... B25F 1/00; B25B 15/02
[52] U.S. Cl. ........................................ 7/165; 81/438; 81/439; 81/461; 411/403; 411/408
[58] Field of Search ............. 7/165; 85/45; 145/50 A, 145/50 R, 114, 130; 81/436–461

[56] References Cited

U.S. PATENT DOCUMENTS

| Re. 6,730 | 11/1875 | Cummings | 145/50 A |
|---|---|---|---|
| 74,490 | 2/1868 | Bidwell | 145/50 A |
| 322,914 | 7/1885 | Cutter | 7/165 |
| 619,416 | 2/1899 | Hunter | 145/50 A |
| 994,804 | 6/1911 | Wahlstrom | 145/50 R |
| 1,260,154 | 3/1918 | Day | 145/50 A |
| 1,797,390 | 3/1931 | Wood | 145/50 A |
| 1,908,081 | 5/1933 | Thompson | 145/50 A |
| 2,792,861 | 5/1957 | Baker | 145/50 A |
| 2,800,829 | 7/1957 | West | 145/50 A |
| 3,175,593 | 3/1965 | Launay | 145/50 A |

FOREIGN PATENT DOCUMENTS 766 of 1914 United Kingdom ............ 145/50 A

Primary Examiner—Roscoe V. Parker
Attorney, Agent, or Firm—Mark C. Jacobs

[57] ABSTRACT

A combined screwdriver and boring apparatus comprising a tool having a handle, removable cutting and screwing blades, each of the blades having both downwardly tapered cutting edges thereon and an elongated tip adapted to enter a hole in the slotted head of a screw for both preforming a seat for the threaded shank of a screw, keying the screw to the blade for holding the screw to the blade when initiating screwing and flat surfaces engaging the slot in the screw for screwing the same.

5 Claims, 10 Drawing Figures

COMBINED SCREWDRIVER AND BORING APPARATUS

BACKGROUND OF THE INVENTION

1. Field of the Invention

The invention relates to a combined screwdriver and boring tool and screw for both preforming a hole for threading the screw therein and screwing the screw into the preformed hole.

2. Description of the Prior Art

Various modifications of screwdrivers have been suggested in the past since the ordinary types of screwdrivers cause screw heads to become burred and galled during use making them difficult to insert and remove. Some suggested devices are described in the following U.S. Pat. Nos.: Re. 6,730; 74,490; 1,260,154; 1,797,390; 1,908,081; 2,793,861; 2,800,829; 3,175,593; and 619,416.

These prior art devices have been generally unsuccessful for a variety of reasons. Either they are expensive to manufacture or inefficient in use. There is a need for a combined screwdriver and boring tool and apparatus which quickly and efficiently preforms a hole, holds a screw and screws the screw into the preformed hole.

SUMMARY OF THE INVENTION

It is an object of this invention to provide combined screwdriver and boring tool and apparatus.

It is a further object of this invention to provide a tool which can preform a hole for a screw, hold the screw and screw it into the performed hole.

These and other objects are preferably accomplished by providing a tool having a handle, removable cutting and screwing blades, each of the blades having both downwardly tapered cutting edges thereon and an elongated tip adapted to enter a hole in the slotted head of a screw for both preforming a seat for the threaded shank of a screw, keying the screw to the blade for holding the screw to the blade when initiating screwing, and flat surfaces engaging the slot in the screw for screwing the same. The tapered edges serve to prepare a countersink recess in the work piece such that after a woodscrew is driven, its top surface is flush with the work piece.

DESCRIPTION OF THE PREFERRED EMBODIMENT

Figure 1:
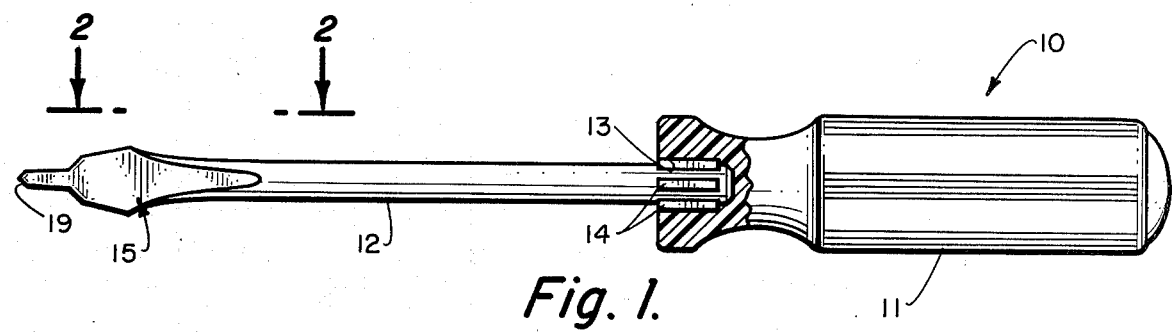
FIG. 1 is a plan view of a combined screwdriver and boring tool in accordance with the teachings of the invention.

Referring now to the drawings, FIG. 1 shows a tool 10 having a handle 11 and an elongated shank 12. Shank 12 may be removable from handle 11 as is well known in the tool art. For example, wing cavities 13, as is known in the art, may be provided in handle 11 for receiving wings 14 on shank 12 thus accomodating tips of differing sizes.

Figure 2:
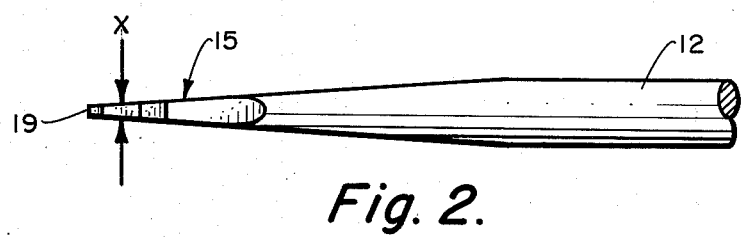
FIG. 2 is a side view of the tip of the tool of FIG. 1 taken along lines 2—2 thereof.
Figure 3:
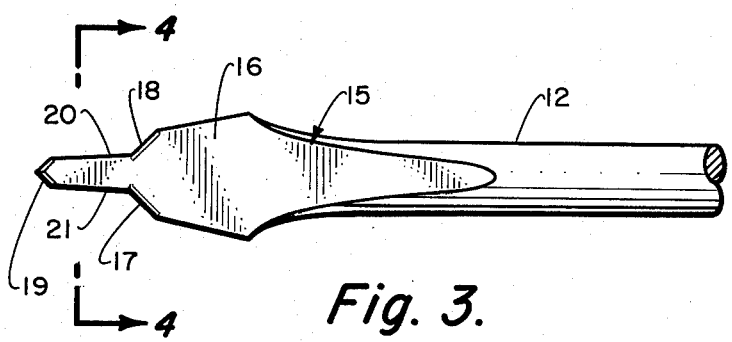
FIG. 3 is a detailed view of the tip of the tool of FIG. 1 and FIG. 2.
Figure 4:
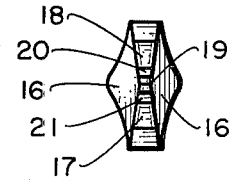
FIG. 4 is a view taken along lines 4—4 of FIG. 3.

Shank 12 terminates in a tip 15. Tip 15 is generally flat and tapered in side view as seen in FIG. 2. As seen in FIG. 3, tip 15 flares first outwardly from shank 12 at flared portion 16, then tapers inwardly at tapered sides 17,18 to an elongated tip 19. As seen in FIG. 4, tip 19 has angled sides 20,21 forming cutting edges. Also, as seen in FIG. 3, tapered edges 17,18 also form cutting edges or surfaces for reasons to be discussed.

Figure 5:
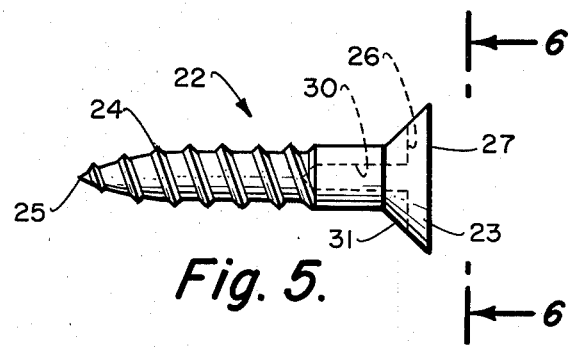
FIG. 5 is a plan view of a screw in accordance with the teachings of the invention.
Figure 6:
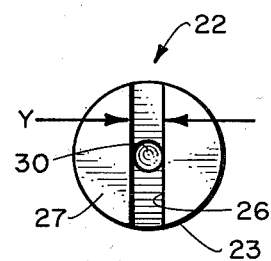
FIG. 6 is a view of the screw of FIG. 5 taken along lines 6—6 thereof.
Figure 7:
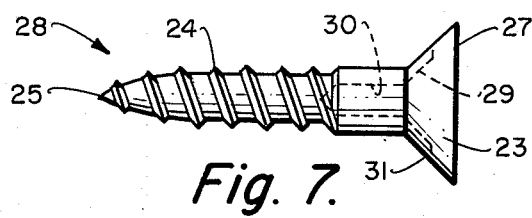
FIG. 7 is a plan view of an alternate screw in accordance with the teachings of the invention.

As shown in FIGS. 5 and 6, a screw 22 is shown in accordance with the teachings of the invention. Screw 22 includes a head 23 and a conventional threaded shank 24 terminating in a point 25. As particularly shown in FIG. 6, an elongated slot 26 extends diametrically across the face 27 of head 23. As shown in dotted lines in FIG. 5, slot 26 is generally flat but may be tapered, if desired, to accomodate conformably the tapered sides 17,18 of tip 15. For example, a modified screw 28 is shown in FIG. 7 wherein like numerals refer to like parts of FIG. 5. In FIG. 7, however, as seen in dotted lines, screw 28 has a downwardly tapered slot 29 for conforming to tapered sides 17,18 of tip 15 of tool 10.

Both screws 22 and 28 include a central hole or aperture 30 for receiving elongated tip 19. Aperture 30 may be circular in cross-section.

Figure 8:
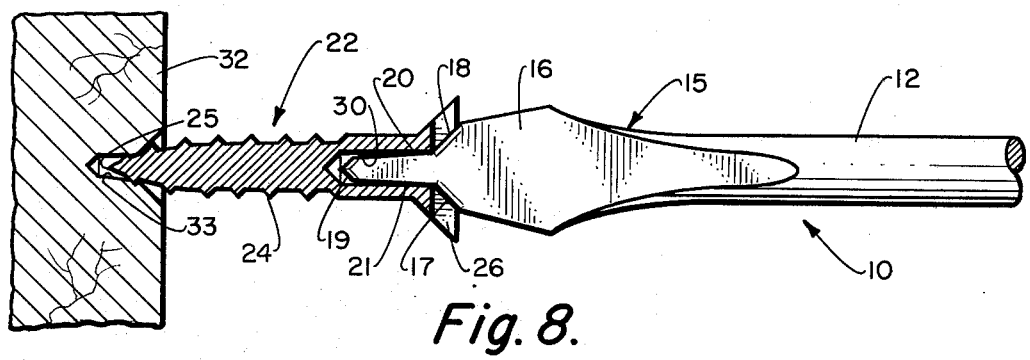
FIG. 8 is a side view of the tip of the tool of FIGS. 1 and 2 engaging the screw of FIGS. 5 and 6.
Figure 10:
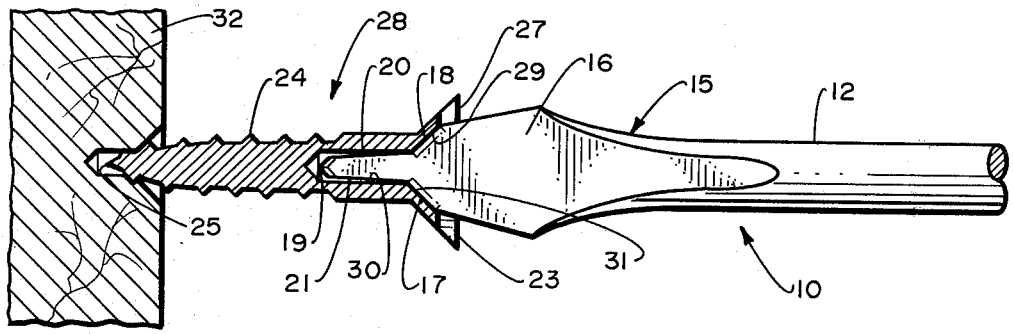
FIG. 10 is a side view of the tip of a tool of this invention engaging the screw of FIG. seven (7).

Reference is made to FIGS. 8 and 10. It is seen that the sole difference in structure pertains to the head portion of the screw. In FIG. 8, screw 27 has a straight slot 26 while the screw 28 of FIG. 10 has a dished or downwardly tapered slot 29, as is best seen in FIG. 7. The screw embodiment of FIG. 7 and 10 is seen to create better contact with driver 10, such that insertion of the screw into the substance (wood, etc.) is easier, that is it requires slightly less effort than the screw of FIG. 5.

Optionally, the tip sides 21 and 20 may be magnetized to further enhance their screw gripping capability.

Figure 9:
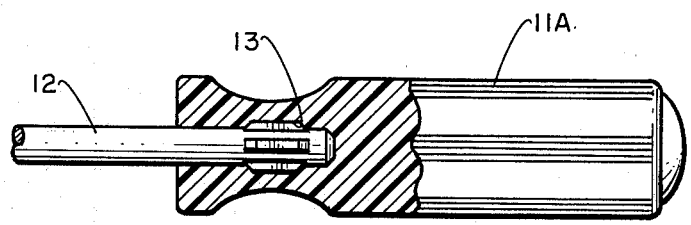
FIG. 9 is a plan view of an alternative embodiment of the tool as shown in FIG. 1.

While the embodiment shown in FIG. 1 provides for a friction fit between wings 14 and wing cavities 13 to retain the wings in said cavities, it is also within the scope of the invention to provide a non-removable shank, by extending handle 11 forward of the wings 13 whereby the wings become permanently engaged in said cavities. Reference is made to FIG. 9 where such a handle is depicted and designated as 11A.

Other replaceable shank embodiments are readily seen for this invention. Thus instead of the friction fit of the shank 12 within handle 11 as per FIG. 1, an annular locking threaded collar that engages threads on both the shank and the handle could be employed to achieve the desired result of removably securing the shaft 12 within handle 11.

As previously mentioned, tapered edges 17 and 18 form cutting edges. These are used as a countersink. This tapered and relieved cutting portion forms a recess in the work object, such that the head of a slotted screw will have its top surface flush with the work piece when the slotted screw is driven.

Thus a two part cutting takes place with the instant tool edges 20 and 21 of tip 19 making the bore for the screw, while edges 17, 18 make the countersink hole to ensure proper fit of a wood screw.

In operation, tip 19 is inserted into wood or the like in which it is desired to insert a screw, as by tapping on the free end of handle 11. The cutting edges 20, 21 on tip 19 bite into the material. When handle 11 is rotated, edges 20, 21 preform a hole for point 25 of screw 22 or 28, while edges 17, 18 form a countersunk area or recess for the proper fit for the head 31 of screw 22 or 28. As shown in FIGS. 8 and 10, tip 19 of tool 10 is then inserted into hole 30 in screw 22 (or screw 28). The screw is then retained temporarily on tip 19 by friction and, in this manner, point 25 is inserted into the preformed hole 33 in wood 32 (or other suitable material). The tapered sides 17, 18 enter slot 26 and, when handle 11 is rotated, screw 22 is quickly and easily threaded into wood 32. Although screw 22 is illustrated in FIG. 8, obviously screw 28 may be used with its tapered slot 29. In both cases, the flat flared portion 16 engages the flat sides of the slot (26 or 29) and serves to drive the screw into the wood.

It can be seen that there is disclosed a combined screwdriver and boring tool which can be used to predrill a hole, hold a screw by friction, and drive the screw into the preformed hole. All of the foregoing may be carried out in a quick and efficient manner and various sized tips may be detachably mounted in handle 11 to provide for versatility of the tool.

Various materials, such as hard plastic, wood, etc. may be used for handle 11. Various suitable metals may be used for shank 12 and tip 15 and screws 22, 28. The thickness x (FIG. 2) may conform generally to the width y of slots 26 and 29 so as to retain the screw to the tool tip, as heretofore described.

Since certain changes may be made in the above apparatus without departing from the scope of the invention herein involved, it is intended that all matter contained in the above description and shown in the accompanying drawings shall be interpreted as illustrative and not in a limiting sense.

I claim:

1. An apparatus for performing a hole in wood or the like, holding a screw prior to screwing the same into a substrate and screwing the screw into the substrate comprising:

a tool having a handle, an elongated shank extending from the handle, and a screw-engaging tip at the terminal end of said shank, said tip having oppositely disposed generally flat sides and a pair of oppositely disposed downwardly extending tapered cutting surfaces terminating in an elongated point; and, a screw having a threaded shank and a tapered head, said head having a driver receiving slot therein, said slot having a first and a second portion, said slot's first portion being a downwardly extending elongated slot, and the second portion commencing at a point inwardly spaced from each end of said first portion and being a downwardly tapered slot conforming to the taper of the head, and communicating with said first portion, said first portion having a pair of spaced opposed generally flat sidewalls forming said slot, the distance between said sidewalls being generally the same as the width of said flat sides so that said tip is insertable into said screw receiving slot in a manner providing a friction fit therebetween, said screw shank having a generally centerally located downwardly extending bore communicating with said slot's second portion for receiving said point therein.

2. In the apparatus of claim 1 wherein the bore in the shank at its end tapers to a point.

3. In the tool of claim 1 wherein said shank is removably mounted in said handle.

4. In the tool of claim 1 wherein said point includes a pair of oppositely disposed cutting surfaces thereon.

5. In the apparatus of claim 1 wherein said bore is generally circular in cross-section.

* * * * *